(12) United States Patent
Bellafiore et al.

(10) Patent No.: US 8,271,139 B2
(45) Date of Patent: Sep. 18, 2012

(54) MULTI-STAGE ACCURATE BLENDING SYSTEM AND METHOD

(75) Inventors: Louis Bellafiore, Wilmette, IL (US); James Sanderson, Chicago, IL (US)

(73) Assignee: Asahi Kasei Bioprocess, Inc., Glenview, IL (US)

( * ) Notice: Subject to any disclaimer, the term of this patent is extended or adjusted under 35 U.S.C. 154(b) by 1063 days.

(21) Appl. No.: 12/124,644

(22) Filed: May 21, 2008

(65) Prior Publication Data
US 2008/0279038 A1   Nov. 13, 2008

Related U.S. Application Data

(63) Continuation-in-part of application No. 11/125,640, filed on May 9, 2005, now Pat. No. 7,515,994, which is a continuation-in-part of application No. 10/688,391, filed on Oct. 17, 2003, now Pat. No. 7,072,742.

(51) Int. Cl.
    *G05B 21/00* (2006.01)
(52) U.S. Cl. .................................................. 700/265
(58) Field of Classification Search .............. 700/238, 700/239, 265–272; 366/131–137, 142, 143; 222/132, 145.1
See application file for complete search history.

(56) References Cited

U.S. PATENT DOCUMENTS

| | | | |
|---|---|---|---|
| 4,013,413 A | 3/1977 | Stewart et al. | |
| 4,474,476 A * | 10/1984 | Thomsen | 366/152.4 |
| 4,494,209 A | 1/1985 | Agarwal | |
| 4,609,874 A | 9/1986 | Reich | |
| 4,979,091 A | 12/1990 | Albers | |
| 5,332,145 A | 7/1994 | Bell et al. | |
| 5,364,510 A * | 11/1994 | Carpio | 134/2 |
| 5,522,660 A | 6/1996 | O'Dougherty et al. | |
| 5,641,410 A * | 6/1997 | Peltzer | 210/739 |
| 5,762,416 A | 6/1998 | LeSire | |
| 5,800,056 A | 9/1998 | Suzuki et al. | |
| 5,891,497 A * | 4/1999 | Bartasis et al. | 426/231 |
| 5,924,794 A | 7/1999 | O'Dougherty et al. | |
| 5,954,954 A | 9/1999 | Houck et al. | |
| 6,048,256 A | 4/2000 | Obeng et al. | |
| 6,120,175 A | 9/2000 | Tewell | |

(Continued)

OTHER PUBLICATIONS

Written Opinion dated Jul. 13, 2009 (6 pps.).

(Continued)

*Primary Examiner* — M. N. Von Buhr
(74) *Attorney, Agent, or Firm* — R. Blake Johnston, Esq.; DLA Piper LLP US

(57) ABSTRACT

An accurate blending system for blending a feed liquid and first and second adjusting liquids includes a first feed means adapted to communicate with a supply of feed liquid, a second feed means adapted to communicate with a supply of the first adjusting liquid and a third feed means adapted to communicate with a supply of the second adjusting liquid. The first, second and third feed means may be pumps, valves or combinations thereof. A mixing device is in communication with the first, second and third feed means. First and second sensors are in communication with the mixing device. A controller communicates with the first and second sensors so that first and second characteristics of the solution in the mixing device can be detected. The controller also communicates with the first and second feed means so that delivery of first and second adjusting liquid to the mixing device can be controlled based upon the detected first and second characteristics of the solution in the mixing device.

26 Claims, 10 Drawing Sheets

U.S. PATENT DOCUMENTS

| | | | | |
|---|---|---|---|---|
| 6,146,008 | A | 11/2000 | Laederich et al. | |
| 6,161,060 | A | 12/2000 | Collins | |
| 6,186,193 | B1 | 2/2001 | Phallen et al. | |
| 6,224,252 | B1 | 5/2001 | Munroe et al. | |
| 6,224,778 | B1 * | 5/2001 | Peltzer | 210/739 |
| 6,280,692 | B1 | 8/2001 | Bartlett, Jr. | |
| 6,286,566 | B1 | 9/2001 | Cline et al. | |
| 6,290,384 | B1 | 9/2001 | Pozniak et al. | |
| 6,395,915 | B1 | 5/2002 | Bellafiore et al. | |
| 6,533,449 | B1 | 3/2003 | Auad | |
| 6,554,162 | B2 | 4/2003 | Schell et al. | |
| 6,572,255 | B2 | 6/2003 | Husher | |
| 6,796,703 | B2 | 9/2004 | Lemke | |
| 6,874,928 | B2 * | 4/2005 | Afnan et al. | 366/142 |
| 7,072,742 | B1 * | 7/2006 | Bellafiore et al. | 700/265 |
| 7,103,450 | B2 * | 9/2006 | Kubiak et al. | 700/267 |
| 7,147,827 | B1 | 12/2006 | Balisky | |
| 7,226,778 | B2 | 6/2007 | Darling et al. | |
| 7,329,425 | B2 | 2/2008 | Darling et al. | |
| 7,515,994 | B2 * | 4/2009 | Bellafiore et al. | 700/265 |
| 7,905,653 | B2 * | 3/2011 | Wilmer et al. | 366/132 |
| 2002/0048213 | A1 * | 4/2002 | Wilmer et al. | 366/136 |
| 2003/0170156 | A1 | 9/2003 | Kemp et al. | |
| 2003/0174306 | A1 | 9/2003 | Grant et al. | |
| 2004/0019462 | A1 | 1/2004 | Gehrlein et al. | |
| 2004/0102380 | A1 | 5/2004 | Fulton et al. | |
| 2005/0029170 | A1 | 2/2005 | Urquhart | |
| 2005/0273203 | A1 | 12/2005 | Bellafiore | |
| 2007/0251596 | A1 * | 11/2007 | Scherzer et al. | 141/2 |
| 2011/0008964 | A1 * | 1/2011 | Hughes et al. | 438/692 |

OTHER PUBLICATIONS

International Searching Report dated Jul. 13, 2009 (4 pps.).

* cited by examiner

MULTI-STAGE ACCURATE BLENDING SYSTEM AND METHOD

CLAIM OF PRIORITY

This application is a continuation-in-part of U.S. patent application Ser. No. 11/125,640, filed May 9, 2005, now U.S. Pat. No. 7,515,994, which is a continuation-in-part of U.S. patent application Ser. No. 10/688,391, filed Oct. 17, 2003, now U.S. Pat. No. 7,072,742.

FIELD OF THE INVENTION

The present invention relates generally to liquid blending systems and, in particular, to a multi-stage system and method that blends three or more liquids together with high accuracy so that solutions having the desired concentrations of the components and/or other characteristics, such as pH, viscosity or optical density, etc., are created.

BACKGROUND

The combining of two or more liquids together to a desired concentration and/or other characteristics, such as pH, viscosity or optical density, etc., of the constituent liquids is fundamental to many industrial processes and commercial products. This combining of liquids may be referred to as blending and is common in many industrial segments including pharmaceutical products, biopharmaceutical products, food and beverage processing products, household products, personal care products, petroleum products, chemical products and many other general industrial liquid products. In addition, blending systems find use in the field of liquid chromatography where blended liquids are provided to chromatography columns to permit the separation of mixtures for analysis or for purification purposes.

On site blending systems provide many advantages over purchasing pre-mixed chemicals. By using a blending system, a single barrel or feedstock concentrate produces many times its volume in diluted solution, depending on the desired concentration of the dilution. Thus, a single feedstock concentrate, used to produce the equivalent of many feedstocks of dilute liquid via, a blending system, greatly reduces, facility costs associated with fabrication of large tanks, floor space required, validation and quality control costs to confirm makeup, spoilage and disposal costs of non-compliant out of date or unused blended solutions. Freight costs associated with chemical delivery are also greatly reduced. In addition, onsite dilution and blending increases the variety of chemical concentrations and mixtures that are immediately available, without requiring a corresponding increase in the number, of feedstocks and chemicals that must be purchased, thereby reducing facility and operating costs and providing the logistical and administrative advantage of reduced inventory.

High accuracy in terms of concentration for blending systems providing liquids to liquid chromatography systems is vital. In addition, quality control concerns favor increased blending accuracy for liquids that are provided to industrial processes and that are used to create commercial products. Indeed, Six Sigma quality control principles dictate that lower variability in an industrial process results in a greater percentage of higher quality products being produced by the industrial process.

It is well known, however, that it is common for different levels of a large feedstock tank filled with a solution to have different proportionate mixtures of the constituent liquids. Gradients exist in large feedstocks in terms of both concentration and temperature. As a result, liquid provided from the feedstock will vary in terms of concentration posing challenges for accurate analysis, quality control analysis, as well as uniform delivery to a process. Feedstock solvents, commercially supplied, have variations in actual concentration from batch to batch as well as innate impurities preventing 100% pure concentrations from being available, in bulk supply.

FIG. 1 illustrates a prior art approach to blending a buffer or solvent solution with a diluting liquid such as water. Feedstocks, supplied from containers or tanks, are illustrated at 10a, 10b, 10c and 12. Feedstocks 10a through 10c contain different concentrations of buffer solution, for example, 0.1M, 0.5M and 1.0M buffer, respectively. Feedstock 12 contains water as a diluting liquid. It should be noted that feedstocks 10a, 10b and 10c could alternatively contain a solvent.

The system of FIG. 1 provides three blending modes, graphically illustrated at 14, 16 and 18. In the graphs illustrated at 14, 16 and 18, the x-axis represents time while the y-axis represents concentration. Graph 14 illustrates the isocratic blending mode where the buffer solution or solvent is provided to a process at a fixed concentration level or set point. Due to the inherent variability of feedstock 10a, the actual concentration delivered to the process, as illustrated at 14, will typically vary by ≧+/−2% from the set point/desired concentration.

Graph 16 of FIG. 1 illustrates the step gradient blending mode where the buffer solution is provided to the process at multiple concentration levels. In the example shown in FIG. 1, there are three concentration level steps, and thus, three set points. During the initial portion of buffer delivery, buffer of a lower concentration level is provided from feedstock 10a. After a period of time, the supply of buffer solution is switched from feedstock 10a to feedstock 10b so that a buffer solution having five times the concentration is provided. Finally, after a second period of time, the supply of buffer is switched from feedstock 10b to feedstock 10c so that a buffer solution having ten times the concentration (as compared to the buffer from feedstock 10a) is provided. As indicated at 16, such an approach passes on the innate feedstock variation of ≧+/−2% from the desired concentration levels.

Graph 18 in FIG. 1 illustrates the linear gradient blending mode where, for example, buffer solution or solvent from feedstock 10c is diluted with water from feedstock 12 so that the concentration of the buffer or solvent increases over time. In other words, the set point ramps up to a specified concentration level. As is known in the art, such blending is accomplished by adjusting the pumps or valves regulating the flow of liquid from feedstocks 10c and 12. While it is desired that the buffer concentration be increased linearly, as illustrated at 18, the resulting blend varies from the desired concentration by ≧+/−2% plus an additional variability of between +/−3% to +/−5%. In addition, due to the high variability, the buffer of feedstock 10c cannot be diluted with the water from feedstock 12 to accurately provide buffer having the concentrations of feedstocks 10a and 10b. The additional feedstocks 10a and 10b must be present in addition to feedstock 10c. In general, the variability indicated at 18 makes the linear gradient blending mode impractical for most applications.

As illustrated at 22 in FIG. 1, the variability for the three blending modes described above causes a variable and non-compliant product quality distribution. The graph 22 represents both the variability of the blend and the variability in product produced in processes relying on accurate blend makeup and delivery when the makeup blend is variable and inaccurate.

A wide range of products require pH adjustments. These include beverages, paints, specialty chemicals, cleaning solutions, buffers and chemically or biologically derived materials including various types of fermentation products, bioreactor products, cell cultures, recombinant expression systems and other natural source materials such as those with a therapeutic, nutritional or other application.

The standard prior art technique for pH adjustment uses a vessel, typically a 500 liter stainless steel or polymeric vessel or bag, containing the solution or product suspension to be adjusted. A pH probe is typically positioned at a port in the vessel wall. A mixer, such as a magnetic mixer or vortex/propeller mixer is usually inserted into the solution or product suspension in the vessel and used to facilitate the pH adjustment process. A pH adjusting solution is manually added to the vessel in portions while mixing occurs. After each manual addition, the solution or product suspension is given a few additional minutes to fully mix and then a few additional minutes for the pH reading to stabilize. The pH of the solution or product suspension is then read using the pH probe. The process is repeated with additional portions of the pH adjusting solution added until the desired pH level is reached.

The above prior art technique of pH adjustment suffers from a number of disadvantages. The process is manual and therefore does not permit automated control. Furthermore, if the desired pH set point is exceeded, the entire batch of solution or product suspension may be put at risk or even lost.

Another disadvantage of the prior art pH adjustment technique arises in the case of pH adjustment involving proteins or other labile materials. For example, when an acidic pH adjusting solution is added to the vessel, it may destroy the protein by hydrolyzing it at the point of contact with the protein in solution. As a result, the yields of protein are reduced and undesired hydrolyzed proteins become present in the product. This is particularly problematic when a very expensive protein, such as a therapeutic protein, is being treated.

A need has developed for a multi-stage blending system and method that provides accurate in-line blending of three or more liquid components. As an example, buffer make-up variability is a very significant contributor to variation in almost all production-scale pharmaceutical processes. This variation is proportional to the scale of an operation and is accepted in the industry as an inevitable consequence of large-scale blending and storage of liquid feedstock. When moving to large-scale tank-farms where thousands or even tens of thousands of liters of buffers are common, the challenges in removing concentration variations from buffers are quite large. As noted previously, on-site blending systems may be used to eliminate such batch-mode tank farms and the associated issues.

Furthermore, there is a demand for larger and larger volumes of dilute buffers for processes to meet increases in monoclonal antibody demand. Most facilities were not designed to accommodate the corresponding increase in buffer volume demand. While the implementation of in-line buffer dilution is a very attractive alternative to the traditional approach of making large volumes in batch mode, the process requires a dilute buffer which must meet not only a conductivity set point, but also a pH set point. A need therefore exists for a blending system and method that may accommodate arid simultaneously blend three liquid feed streams: (1) salt concentrate, (2) water and (3) acid/base modifier.

As another example, a purification process may require the accurate blending of three or more liquids, such as alcohol, salt solution and water. Such a system would need to control alcohol concentration and salt concentration based on conductivity. Such a process is especially important in oligonucleotide and peptide purification.

DETAILED DESCRIPTION OF EMBODIMENTS

Figure 2:
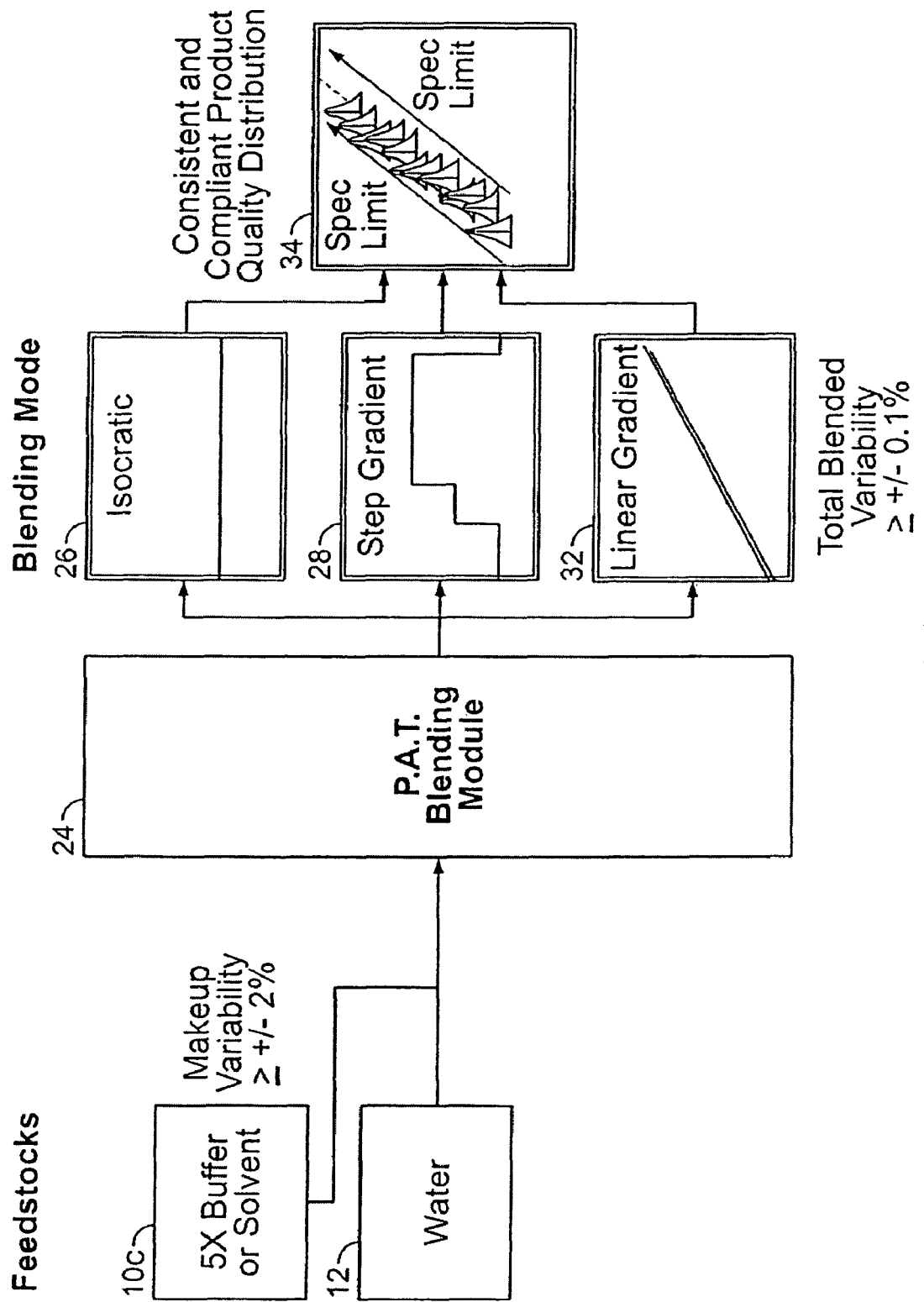
FIG. 2 is a flow diagram illustrating approaches to blending using an accurate blending module and the impact on product variability.

With reference to FIG. 2, an accurate blending module 24 has been placed in communication with feedstocks 10c and 12. While the buffer or solvent from feedstock 10c varies $\geq$+/−2% from the desired concentration levels, the accurate blending module 24 can provide a blended variability of only +/−0.1% for each of the isocratic, step gradient and linear gradient blending modes, as illustrated at 26, 28 and 32, respectively.

Due to the precision blending provided by the module 24, feedstocks 10a and 10b are no longer required as the concentrations provided thereby may be obtained instead by blending buffer from feedstock 10c and water from feedstock 12. As illustrated by the liquid chromatography results illustrated at 34, the arrangement of FIG. 2 provides consistent and compliant product quality distribution.

Figure 3:
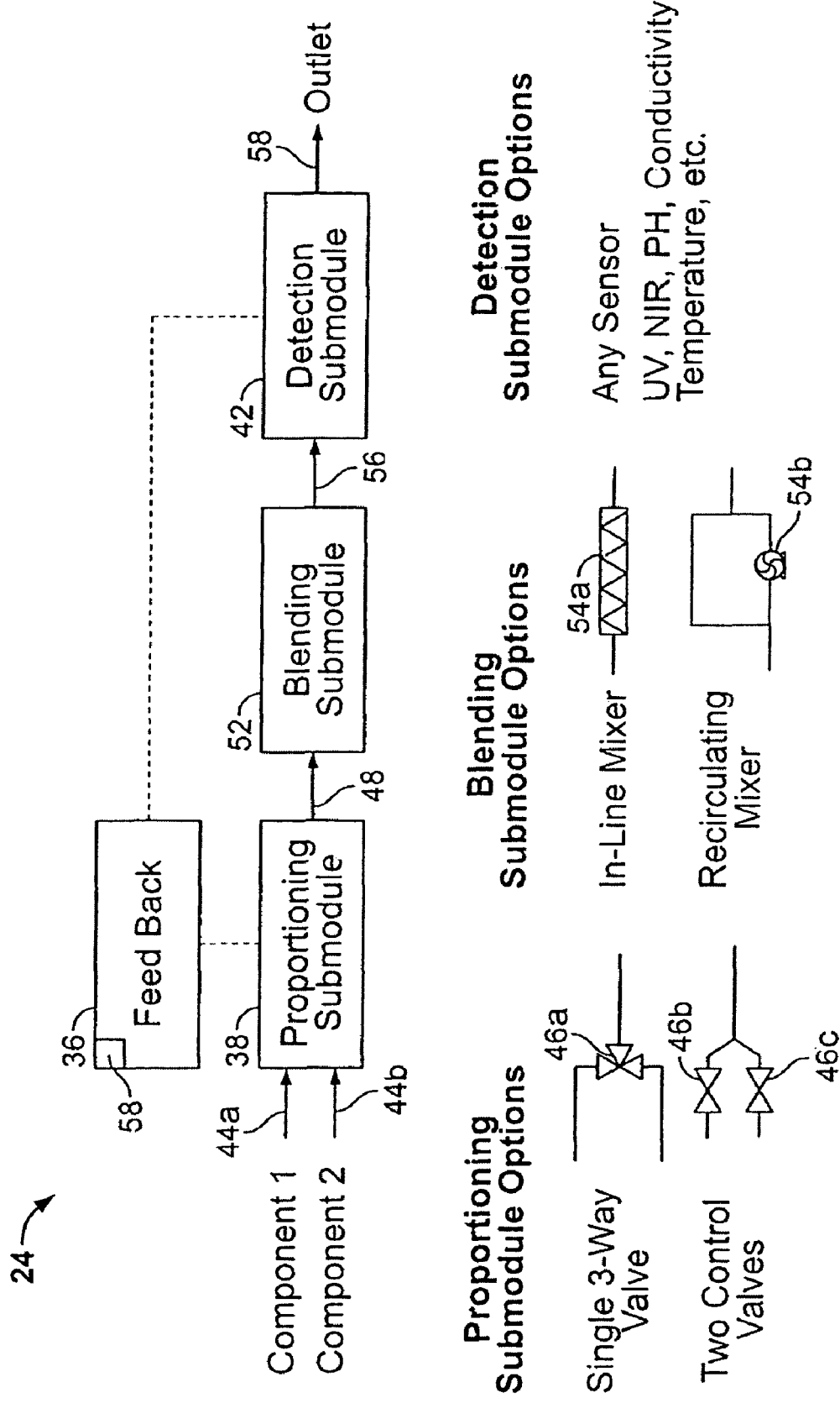
FIG. 3 is a schematic of an embodiment of the accurate blending module Of FIG. 2.
Figure 4:
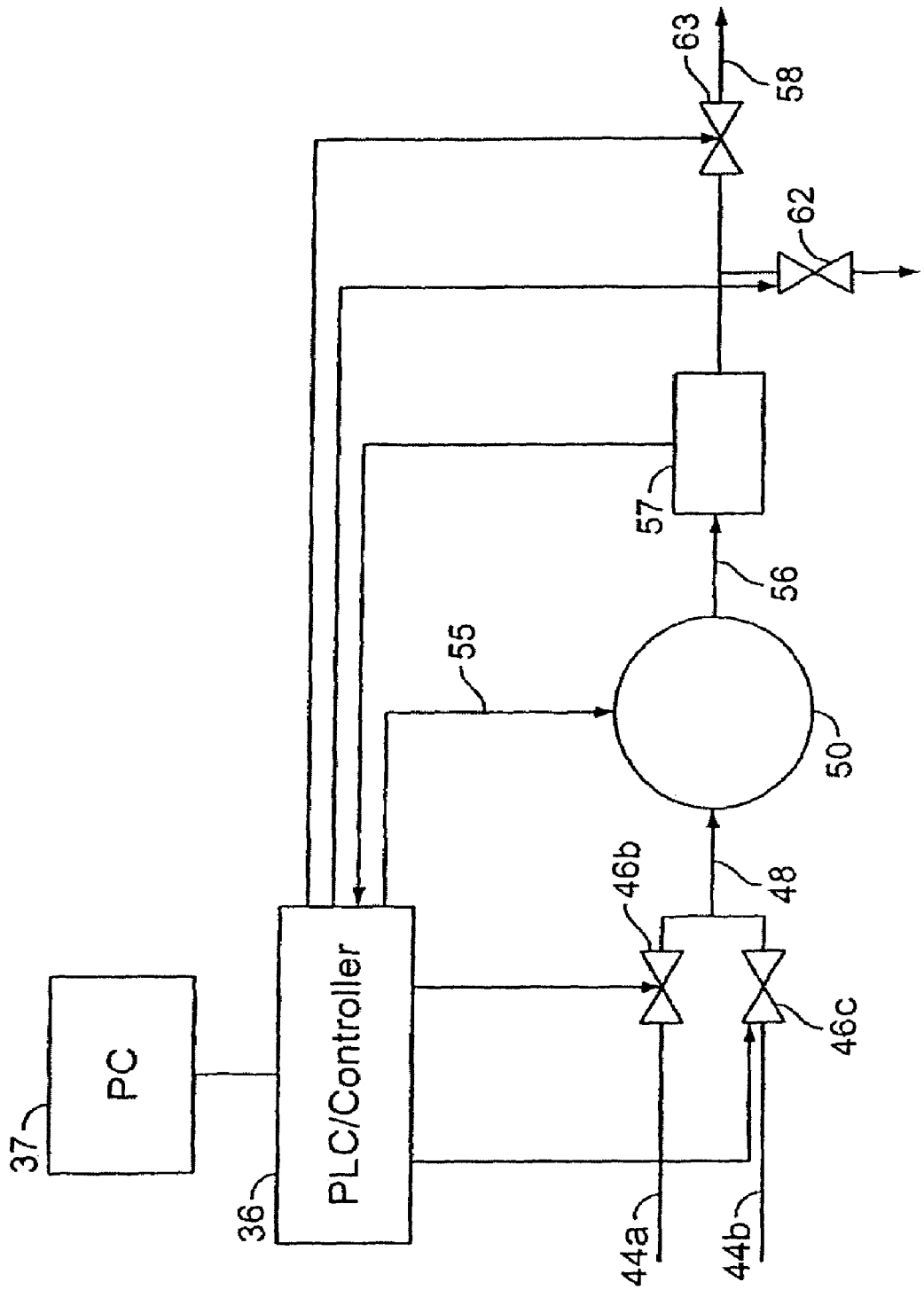
FIG. 4 is a schematic of the module of FIG. 3 providing greater detail of the components.
Figure 6:
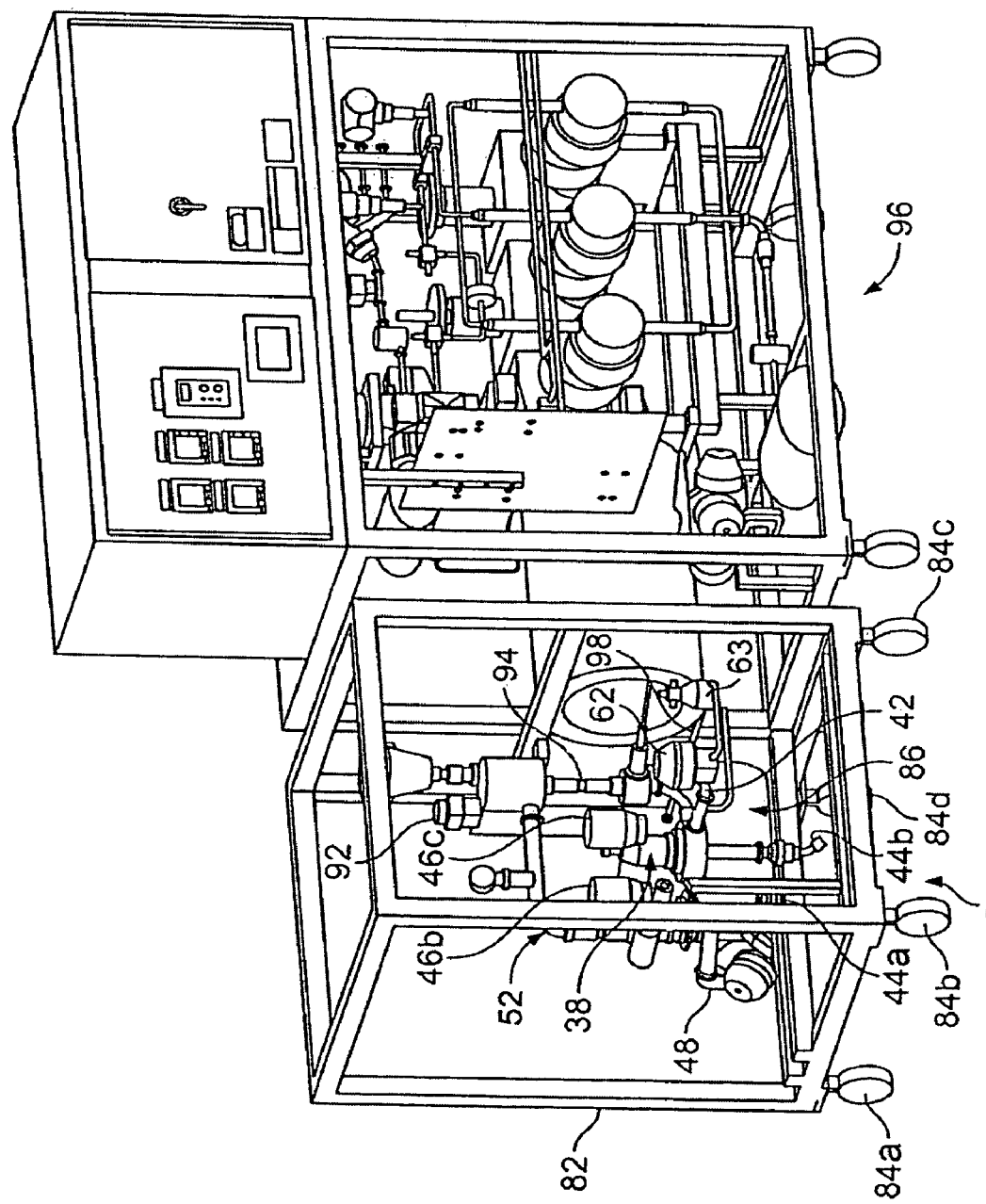
FIG. 6 is a perspective view of an industrial system retrofitted with an embodiment of the blending module of FIGS. 2-4.

The details of an embodiment of the accurate blending module, indicated in general at 24, are presented in FIGS. 3 and 4. A programmable logic, controller (PLC) 36 or onboard controller that communicates with an external personal computer (PC), indicated at 37 in FIG. 4, communicates with a proportioning submodule 38 and a detection submodule 42. With the latter configuration, the onboard controller communicates with the PC via an Ethernet connection or a serial port connection. Alternatively, a soft PLC approach, whereby software residing on the PC eliminates the need for an onboard PLC, could be employed. With such an arrangement, however, a hardware controller (but not a PLC) may still be required on the module skid (FIG. 6).

The sensor (57 in FIG. 4) of the detection submodule 42 of FIG. 3 is calibrated prior to use with the critical or variable feed (such as buffer or solvent) concentration tuned to the desirable sensor output level, typically 100% or full scale. The sensor output is zeroed with water.

Two customer-supplied liquid feeds 44a and 44b are connected to the proportioning submodule 38. It should be noted that while two feeds are illustrated, additional feeds may also be used. The proportioning submodule continuously merges the two separate incoming liquid streams (such as a salt concentrate solution and purified water) with valving into one stream. As illustrated in FIG. 3 at 46a and 46b, 46c, respectively, the valving of proportioning submodule 38 may be either a single 3-way valve or two control valves that are automated and communicate with PLC 36 or PC 37 (if the soft PLC approach is implemented) in the manner described below. The two control valve arrangement (46b and 46c) is illustrated in FIG. 4. Valves 46a, 46b and 46b may be any type of valve that may be automated. Examples include diaphragm valves, ball valves arid needle valves which may be controlled in a digital or analog fashion.

The merged liquid stream 48 exiting the proportioning submodule 38 is mixed within a fixed volume (50 in FIG. 4) in blending submodule 52 to ensure that the mixture is. fully blended. As illustrated at 54a and 54b in FIG. 3, the blending submodule may utilize an in-line mixer 54a or a recirculating mixer 54b, both of which are known in the art, positioned within the fixed or variable volume 50 of FIG. 4. Alternatively or in addition to dynamic mixing, static mixing may also be used in the blending submodule 52. The volume of the blending submodule is selected based upon the total flow requirement for the module (how much buffer or solvent is needed at what flow rate). It should be noted that either a fixed mixing rate or volume or a variable mixing rate or volume may be used in the blending submodule. As illustrated at 55 in FIG. 4, if dynamic mixing is used, the mixing device may be controlled by the PLC 36 or PC 37.

The blended liquid stream 56 exiting the blending submodule 52 encounters the detection submodule 42. An ionic (e.g. conductivity or pH for a salt solution) or spectral (e.g. near-infrared or ultraviolet for an alcohol or other solvent solution) measurement of the blend, as appropriate, is taken by an in-line sensor, indicated at 57 in FIG. 4, within the detection submodule 42.

As indicated in FIG. 3, the detection submodule may use a range of sensor types including NIR, conductivity, temperature, pH etc. Basically any sensor that can detect specific properties of the critical (or variable) feed and outputs a measurable signal may be used. Typically die signal is analog, but it may be digital. Examples of suitable sensors include fixed or variable, wavelength near infrared or ultraviolet sensors (such as those manufactured by Wedgewood, Foss, Custom Sensors, Optek and Knauer), pH sensors (such as those manufactured by TBI Bailey and Yokagawa) and conductivity sensors (such as those manufactured by TBI Bailey and Wedgewood). The sensor 57 within the detection submodule 42 communicates the composition of the blended liquid stream with the PLC 36 or PC 37.

The outputted signal from the sensor 57 (FIG. 4) of the detection submodule 42 (FIG. 3), which is typically analog, provides the PLC 36 or PC 37 with a Process Value (PV) for a software PID (gain, integral, derivative) feedback loop. A Set Point (SP) for the software feedback loop will have been set in the PLC 36 or PC 37 by the user via a user interface 58 (FIG. 3) which may be the PC 37 of FIG. 4. Based on the discrepancy between the measured PV and the user-defined SP, the PLC's (or PC's) software PID feedback mechanism continually adjusts the signal that is sent to the automated valving of proportioning submodule 38, which are valves 46b and 46c in the embodiment of FIG. 4. This signal is called the Output. The Output signal causes constant adjustments in the proportioning submodule valves' opening/closing such that the PV continuously matches the SP. The Output signal is scaled by the, software of the PLC or PC to a process value (such as molarity or concentration).

Figure 5:
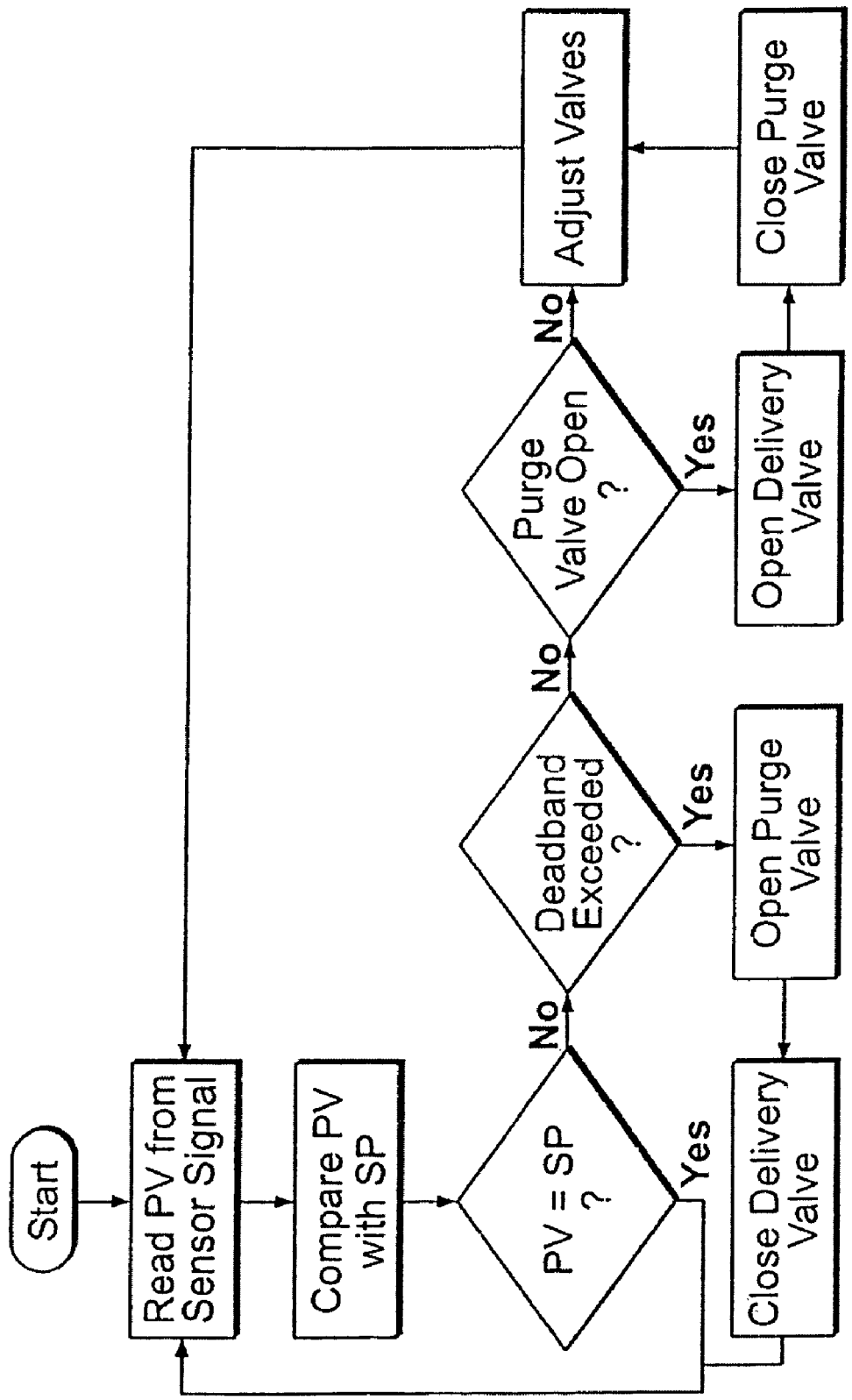
FIG. 5 is a flow chart illustrating the processing performed by the software of the PLC or PC of FIGS. 3 and 4.

In summary:
SP=set point=user defined value or blending percentage
PV=process value=measured value that is coming from the measuring sensor
Output=continuously adjusting signal that the software is programmed to send to the mixing valves that allows the measured PV to approach the user-defined SP FIG. 5 is a flowchart illustrating the processing performed by the software of the PLC or PC in performing the above steps. While busses are not required for the PLC or PC to control the valves, etc., they provide faster speed arid response for the module. As an example, Profibus may be used for valve control while Foundation Fieldbus may be used for the other signals, As advances in process control software and hardware become available, these faster speed options can be used to further improve performance and reliability.

As indicated in FIG. 5, there is also a user-specified "deadband" or acceptable tolerance for the Process Value. If the PV falls outside of the SP by a value greater than the deadband during the process, then a purge valve, illustrated at 62 in FIG. 4, will open and a delivery valve, illustrated at 63 in FIG. 4, will close to divert the out-of-spec liquid away from the rest of the system. Meanwhile, the software PID loop attempts to correct the liquid blend. Once corrected, the liquid is directed back to the system.

The precisely mixed merged stream, indicated at 58 in FIGS. 3 and 4, which has now been verified as accurate since the software has enabled the PV to match the SP, is then delivered.

As an example, after a calibration of sensor response with appropriate buffer and water, a user has purified water connected to one inlet of the module and 1M NaCl solution connected to. the second inlet of the module. The user specifies the SP as 0.1M NaCl . The module's software will adjust the behavior of the blending valves such that the measured PV detected by, in this case, the conductivity sensor, shall be as close to the reading corresponding to 0.1 M NaCl as possible.

As illustrated in FIG. 6, an embodiment of the accurate blending module, indicated in general at 24, includes a skid 82 upon which the components of FIGS. 3 and 4 are mounted. The skid 82 features rollers 84a, 84b, 84c and 84d so that the module may be easily rolled across a surface, although fixed installations are also possible.

Figure 1:
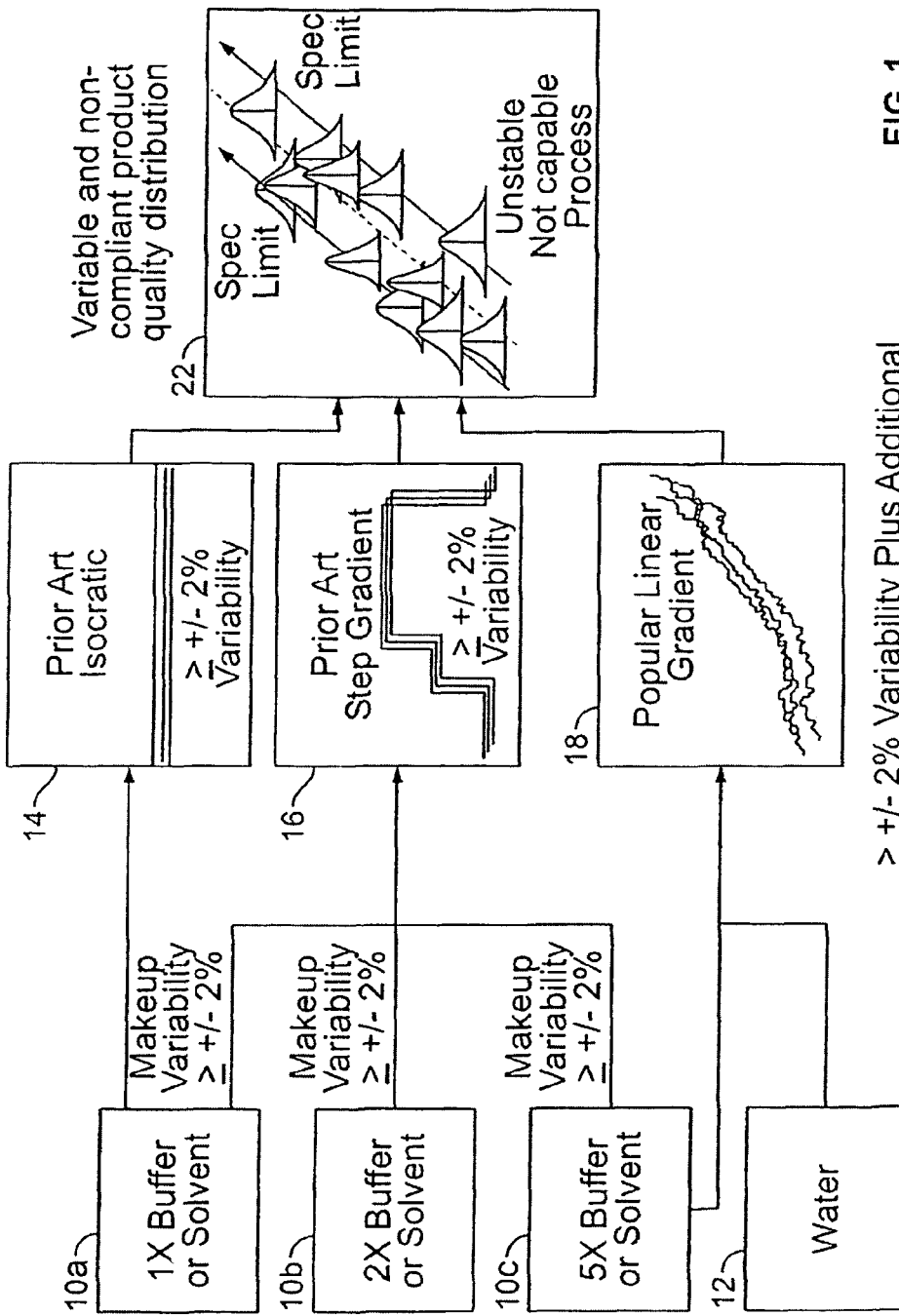
FIG. 1 is a flow diagram illustrating prior art approaches to blending buffers or solvents with a diluting liquid such as water and the resulting product variability.

The module 24 may optionally include a pump, illustrated at 86 in FIG. 6, that blends the liquid from feedstocks, such as those illustrated 10a-10c and 12 in FIGS. 1 and 2, which are delivered through the liquid feeds 44a and 44b to the proportioning submodule 38. In FIG. 6, the proportioning submodule takes the form of two control valves. After leaving the proportioning submodule, the liquid stream, 48 in FIGS. 3 and 4, travels through line 48 to the blending submodule 52. In FIG. 6, the blending submodule takes the form of a recirculating and fixed volume mixer. Blending submodule 52 optionally includes a bubble trap 92 so that the blended liquid stream (corresponding to blended liquid stream 56 in FIGS. 3 and 4) traveling through line 94 to the detection submodule 42 does not contain bubbles.

As described previously, the liquid exiting the detection submodule travels through either valve 62 or 63. If travel is through the latter valve, the liquid can be delivered to an existing process, or system, as indicated in general at 96, through line 98. The stream traveling through line 98 corresponds to the precisely mixed stream 58 in FIGS. 3 and 4. It is to be understood that the complete blending module can be connected to an existing system by means of a single tubing connection, as illustrated in FIG. 6, or alternatively can be used in a stand-alone way to generate adaptively-controlled liquid blends.

The accurate blending module integrates with the existing process in ways ranging from a simple relay switch closure which defines the module's start/stop points, to a complete renovation of any existing controller hardware and software permitting replacement with or installation of latest version hardware and software for optimized performance. For a simple switch, or contact closure, the existing system must send a digital Output to the module that signals the module to initiate its blending procedure, or stop its blending procedure. For a complete hardware and software replacement, the existing controller hardware, such as a programmable logic controller, is removed and replaced with updated hardware, software and PC.

The module is built from various components, such as valves, pumps, and sensors that are sized and specified for use with the existing system and/or the processes for which it will be used.

A portable closed-system unit that upgrades an existing process pumping system may thus be provided to permit precise and reproducible buffer and/or solvent blends to be delivered from the existing system. These precise buffer and/or solvent blends can be leveraged by the equipment user to greatly enhance their particular biopharmaceutical/nutraceutical/fine chemical/industrial process of interest. In addition, a standalone blending system may be provided to provide liquids containing constituents at precise concentration levels and/or desired characteristics such as pH, viscosity or optical density, etc., to any process or process equipment that may benefit from reduced variability and increased reproducibility and robustness.

Figure 7:
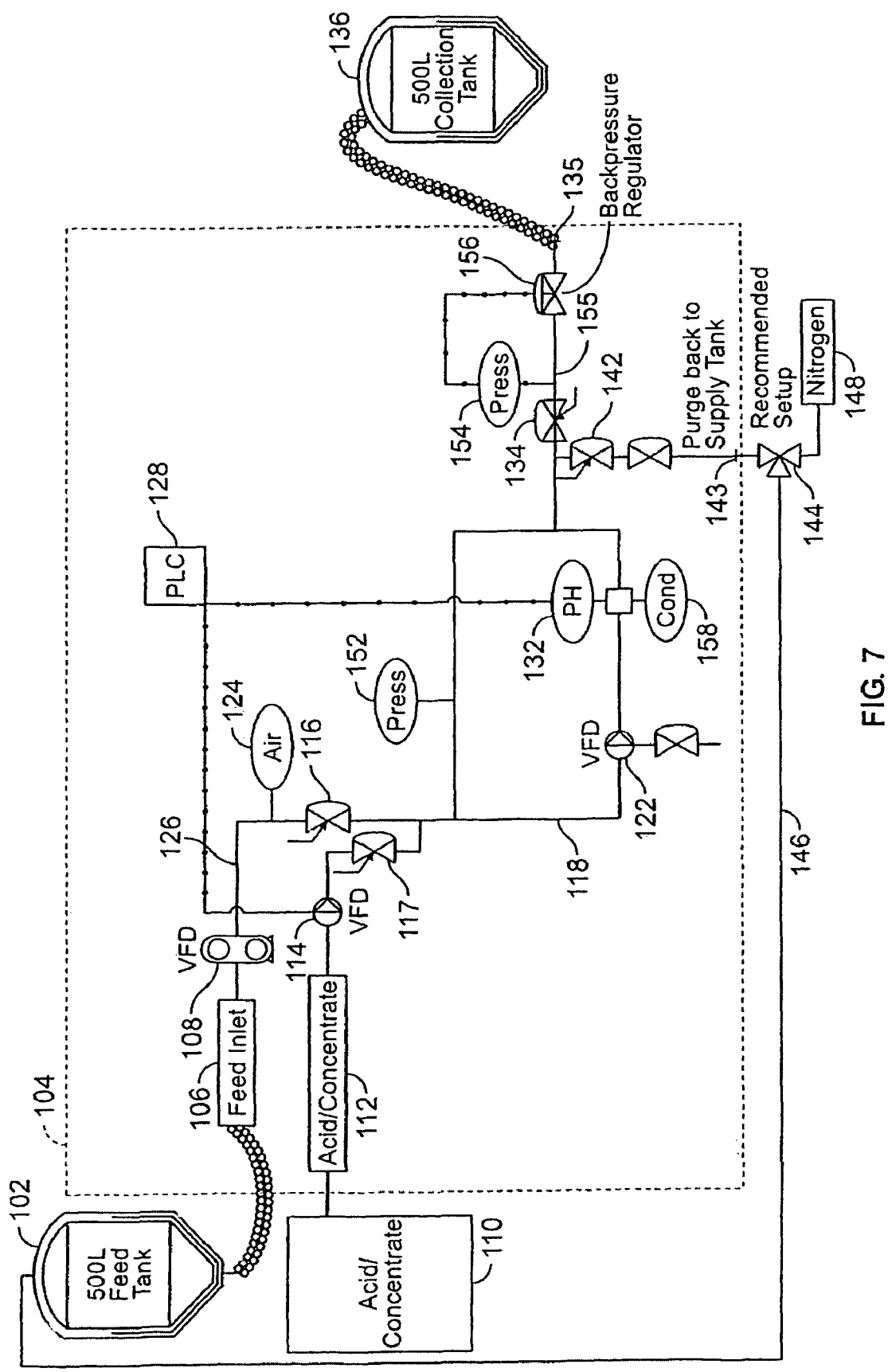
FIG. 7 is a schematic of an accurate blending module that is particularly well-suited for use in adjusting the pH level of protein suspensions.
Figure 8:
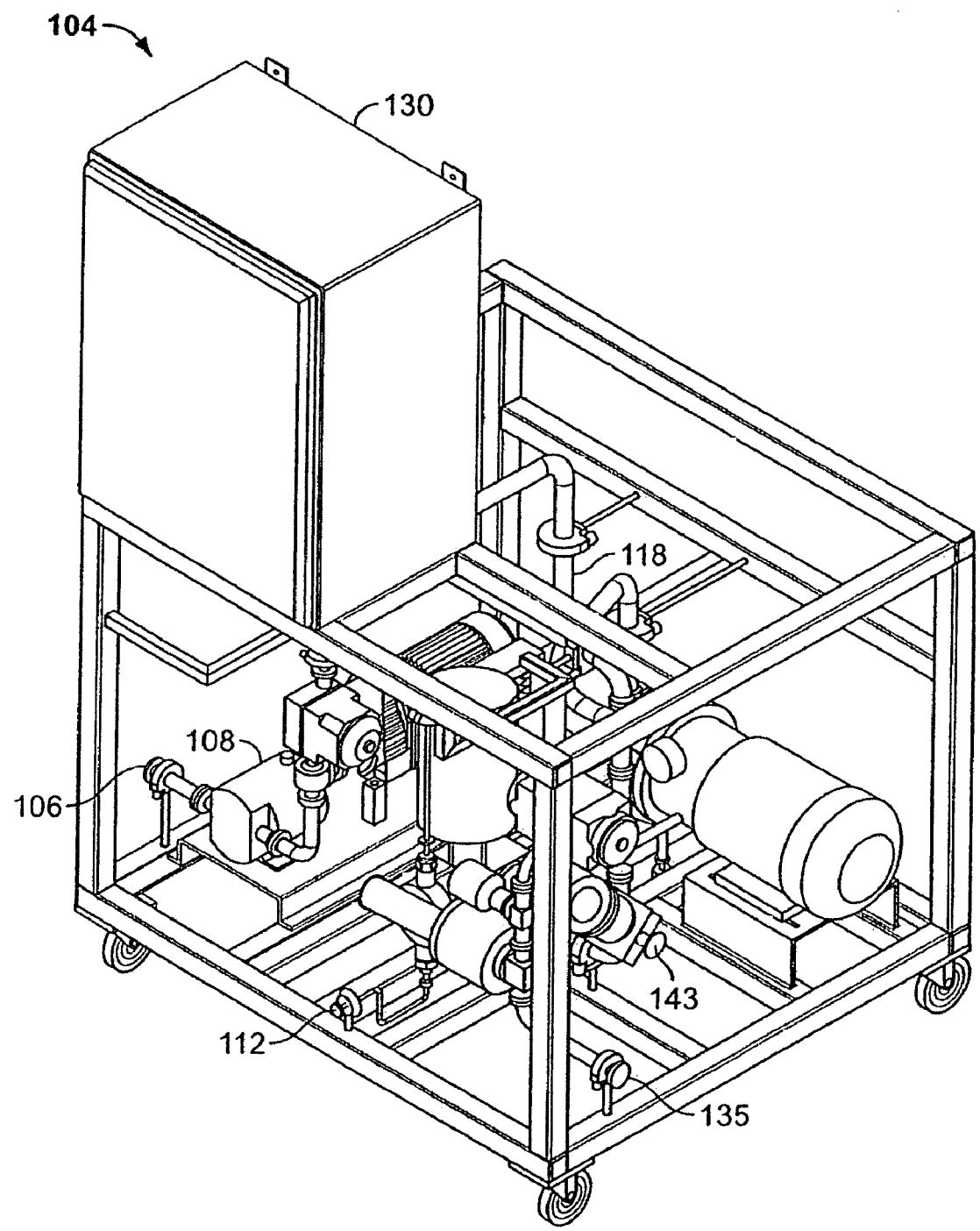
FIG. 8 is a perspective view of the accurate blending module of FIG. 7 mounted on a cart.

FIGS. 7 and 8 illustrate an embodiment of the accurate blending module that is particularly suited for adjusting the pH level of a solution containing proteins. For example, therapeutic proteins typically undergo a viral deactivation step that uses a base such as sodium hydroxide. As a result, the pH of the protein solution must be brought down to neutral by the addition of acid. As described previously, the acid can destroy the very high value therapeutic protein at the point of contact by hydrolysis. As a result, it is desirable for a system to add the acid continuously in a very precisely controlled fashion and in a non-destructive manner. The embodiment of FIGS. 7 and 8 accomplish this.

It should be noted that while the embodiment of FIGS. 7 and 8 will be described in connection with adjusting the pH of a solution containing a therapeutic protein, it is to be understood that the system of FIGS. 7 and 8 could be used to adjust the pH of any solution or suspension that would benefit from accurate and non-destructive pH adjustment. As will be described below, the accurate blending module of FIGS. 7 and 8 could also be used to perform other types of adjustments.

With reference to FIG. 7, a primary feed vessel 102 contains a feed solution such as a therapeutic protein solution requiring pH adjustment. The vessel may be, for example, a 500 liter tank or bag. The feed tank is connected to the accurate blending module, indicated by dashed line 104 in FIG. 7 and in general at 104 in FIG. 8, via feed inlet 106. The feed inlet 106 communicates with a variable frequency drive controlled feed pump 108. Due to its variable frequency drive, the pumping speed of the feed pump 108 may be accurately controlled. The feed pump 108 preferably is a low shear rotary lobe pump so that the delicate proteins in the solution from tank 102 are not damaged. Appropriate pumps are available from the ITT Jabsco company of Foothill Ranch, Calif.

A supply of adjusting solution, such as acid/concentrate 110, is connected to the adjusting solution inlet or acid/concentrate inlet 112 of the accurate blending module 104, which in turn communicates with a variable frequency drive controlled adjusting or acid/concentrate pump 114. Adjusting or acid/concentrate pump 114 is preferably a diaphragm-type dosing pump that provides very precise control with regard to the rate that the acid/concentrate is pumped. Suitable pumps are available from the American Lewa, Inc. of Holliston, Mass.

As illustrated in FIG. 1, the outlet streams from feed pump 108 and acid/concentrate pump 114 travel through valves 116 and 117, respectively, to recirculation mixing loop 118. Recirculation mixing loop 118 is provided with a variable frequency drive recirculation pump 122 which recirculates solution around loop 118 so that the solution becomes thoroughly mixed. Recirculation pump preferably is a sanitary disc pump so that damage to the proteins in the solution being recirculated through loop 118 is avoided. Suitable disc pumps are available from Discflo Corporation of Santee, Calif.

An air sensor 124 is positioned in the line 126 that runs between the outlet of feed pump 108 and mixing loop 118. The air sensor detects the absence of liquid in line 126 and communicates with the system controller, which is preferably a programmable logic controller (PLC) 128. The controller 128 shuts down the system pumps and provides the appropriate indication when the feed tank 102 is empty.

The controller 128 is housed in the electronics cabinet of the module, illustrated at 130 in FIG. 8. Controller 128 controls, as will be explained below, many of the valves arid pumps of the module 104.

At start-up, valves 116 and 117 are opened, then feed pump 108, acid/concentration pump 114, and recirculation pump 122 are activated by controller 128 so that solution containing therapeutic proteins and the adjusting acid is pumped to mixing loop 118 and recirculated therein. The pH of the solution being recirculated through loop 118 is detected by a pH probe or sensor 132. As illustrated in FIG. 7, the pH sensor 132 communicates with the system controller 128 which controls acid/concentrate pump 114. Acid is continuously delivered in variable quantities as controlled by the controller 128. The speed of pump 108 is typically maintained constant. Initially, valve 142 will be open, diverting the output of the recirculation loop back to the feed tank 102. Only when the target pH has been attained will the valve 134 open and valve 142 close via controller 128 to deliver the output of the recirculation loop through outlet port 135 to the collection tank 136. The acid (pH adjusting solution) addition rate Continues to be based on feedback control from the pH sensor 132.

If the solution being recirculated and mixed in the loop 118 goes out of spec, it must be reconditioned. The solution in loop 118, which contains therapeutic proteins, is too valuable to merely purge and dump. As a result, when pH sensor 132 detects that the solution in loop 118 has gone out of spec, controller 128 opens valve 142 and closes valve 134. The solution is then pumped out of loop 118, through purge port 143 (see FIG. 8) arid three-way valve 144, which has been configured to direct the solution through return line 146. The but-of-spec solution travels through the return line 146 and back to feed tank 102. When recirculation loop 118 has been emptied, recirculation pump 118 is stopped arid valve 142 is closed by the controller 128. Three-way valve 144 is then reconfigured so that a source of pressurized nitrogen gas 148 is place in communication with return line 146. As a result, the liquid remaining/trapped in return line 146 is flushed back to the feed tank 102. The source of pressurized nitrogen arid the associated three-way valve could be, for example, user supplied.

Pressure sensor 152 is positioned in the recirculation loop 118 and detects the pressure therein. The pressure sensor 152 communicates with the controller 128 and stops the appropriate pumps to prevent overpressure within loop 118. Pressure sensor 154 detects the pressure in line 155, which runs between the mixing loop 118 and outlet port 135 and adjusts valve 156 to provide the user-specified backpressure in line 155.

The versatility of the accurate blending module of FIGS. 7 and 8 may be increased by providing mixing loop 118 with a conductivity sensor 158 (FIG. 7). As a result, a solution or suspension in loop 118 may be adjusted based upon a desired conductivity value instead of pH.

In a typical pH adjustment application, it is important that the controller software has the ability to manage the highly non-linear, 14 decades of concentration involved. Software, such as that provided by Expertune or Rockwell Automation, is used to enhance the advanced PID control features of the controller 128 in the preferred embodiment to manage this non-linearity.

The embodiment of the accurate blending module illustrated in FIGS. 7 and 8 therefore provides precise addition of acid or other adjusting solution in an automated fashion. The addition of the adjusting solution also occurs in a non-destructive fashion which is key when treating expensive feed solutions such a solutions containing therapeutic proteins.

Figure 9:
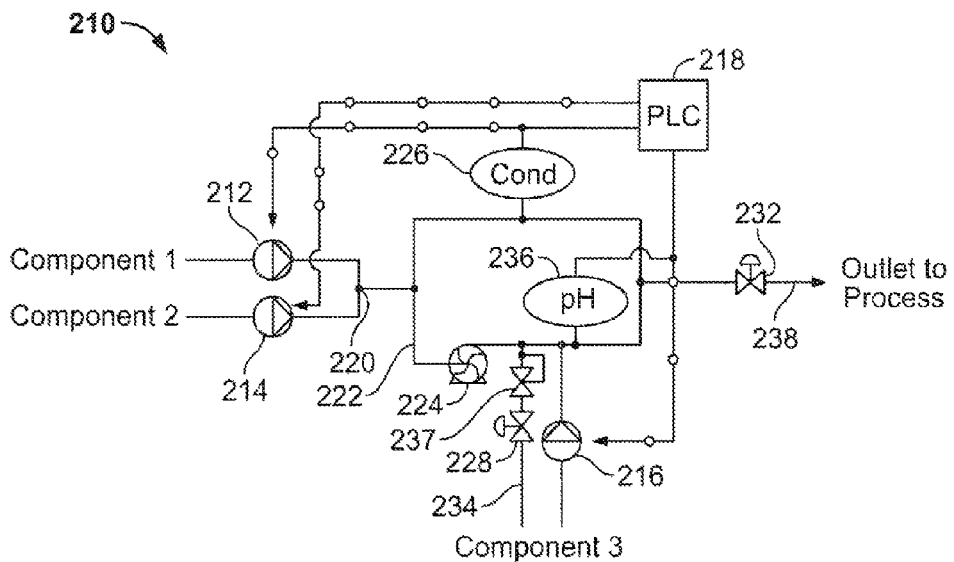
FIG. 9 is a schematic of a first embodiment of the multi-stage accurate blending system of the invention.

A multi-stage blending system is indicated in general at 210 in FIG. 9 and illustrates a first embodiment of the system of the present invention. While this system will be discussed in terms of creating a buffer, it is to be understood that if may be used for accurately blending other types of liquid components. With reference to FIG. 9, a salt concentrate solution is provided as a first adjusting liquid or component to the inlet of first feed pump 212. Water is provided as a feed liquid or second component to the inlet of second feed pump 214. In addition, an acid/base modifier solution is provided as a second adjusting liquid or third component to the inlet of third feed pump 216. Pumps 212, 214 and 216 are preferably variable frequency drive pumps so that their pumping speeds may be accurately controlled via a programmable logic controller 218, which communicates with the pumps and valves, of the system.

As illustrated in FIG. 9, the outlet streams from pumps 212 and 214 are joined at T-junction 220 and travel to a mixing device in the form of recirculation mixing loop 222. The outlet of pump 216 also communicates with the recirculation mixing loop 222. Recirculation mixing loop 222 is provided with a recirculation pump 224 which recirculates solution around loop 222 so that the liquids therein becomes thoroughly mixed.

At start-up, pumps 212, 214, 216 and 224 are activated by controller 218 so that solution containing salt concentrate and water and an acid/base modifier solution are pumped to mixing loop 222 and recirculated therein. A purge valve 228 and a delivery valve 232 are closed.

The conductivity of the solution being recirculated through loop 222 is detected by a conductivity sensor 226. As illustrated in FIG. 9, the conductivity sensor 226 communicates with the system controller 218 which controls pumps 212 and 214. Pump 214 is held at constant speed while pump 212 is adjusted so that salt concentrate solution is continuously delivered to the mixing loop 222 in variable quantities as Controlled by the controller 218.

As illustrated in FIG. 9, a pH sensor 236 also communicates with mixing loop 222 to detect the pH of the solution therein. The pH sensor 236 also communicates with controller 218 which, as noted previously, controls pump 216. Pump 216 is adjusted so that acid/base modifier solution is continuously delivered to the mixing loop 222 in variable quantities as Controlled by the controller 218.

Only when the target pH and conductivity levels have been attained will the delivery valve 232 open via controller 218 to deliver the output of the recirculation loop to the process through outlet port 238. In both the present embodiment and alternative embodiments described below, the target levels may be a predetermined, set point or a gradient which the valves may be adjusted to accomplish. The salt concentrate solution and acid/base modifier solution addition rates continue to be based on feedback control from the conductivity sensor 226 and pH sensor 236, respectively.

If the pH sensor 236 and/or the conductivity sensor 226 detect(s) that the solution in the loop 222 has gone out of spec, controller 218 opens purge valve 228 so that the solution is pumped out of the loop through purge line 234 so that it may be dumped or directed to a container for recirculation (as with the system of FIG. 7). Regulator valve 237 controls backpressure in line 234 and thus loop 222.

Figure 10:
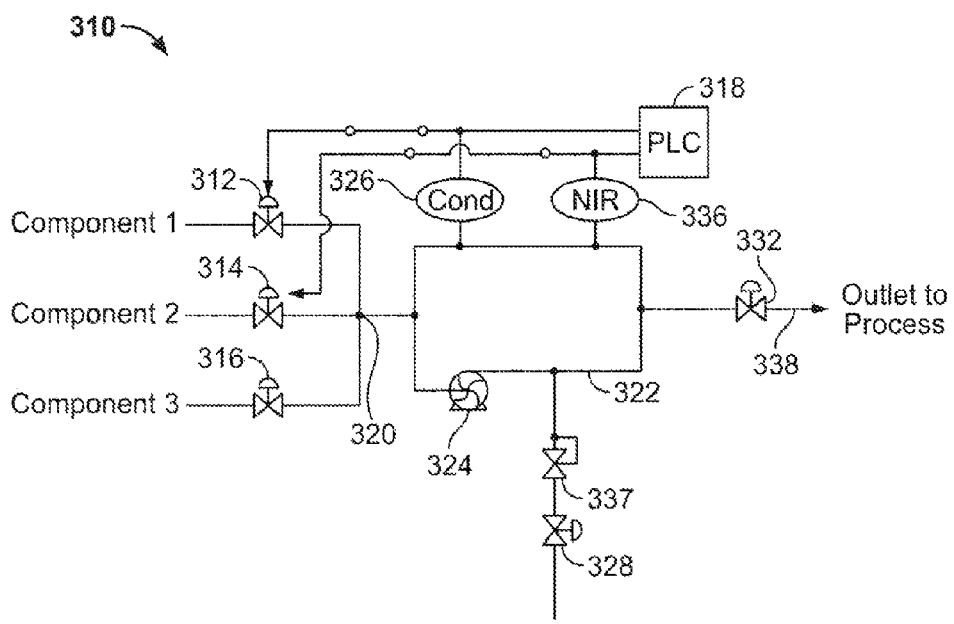
FIG. 10 is a schematic of a second embodiment of the multi-stage accurate blending system of the invention.

A multi-stage blending system is indicated in general at 310 in FIG. 10 and illustrates a second embodiment, of the system of the present invention. While this system will be discussed in terms of Creating a purifier solution, it is to be understood that it may be used for accurately blending other types of liquid components. With reference to FIG. 10, a salt concentrate solution is provided as a first adjusting liquid or component to the inlet of first feed valve 312. Alcohol is provided as a second adjusting liquid or component to the inlet of second feed valve 314. In addition, water is provided as a feed liquid or third component to the inlet of third feed valve 316. Valves 312, 314 and 316 are automated control valves so that their operation may be accurately controlled via a programmable logic controller 318, which communicates with the pump and valves of the system.

As illustrated in FIG. 10, the outlet streams from valves 312, 314 and 316 are joined at junction 320 and travel to recirculation mixing loop 322. Recirculation mixing loop 322 is provided with a recirculation pump 324 which recirculates solution around loop 322 so that the solutions therein becomes thoroughly mixed.

At start-up, valves 312, 314 and 316 and pump 324 are activated by controller 318 so that solution containing salt concentrate, water and alcohol flows to mixing loop 322 arid are recirculated therein. Purge valve 328 and delivery valve 332 are closed.

The conductivity of the solution being recirculated through loop 322 is detected by a conductivity sensor 326. As illustrated in FIG. 10, the conductivity sensor 326 communicates with the system controller 318 which controls valves 312 and 316. Valve 316 is held open to a fixed degree while valve 312 is adjusted so that salt concentrate solution is continuously delivered to the mixing loop 322 in variable quantities as controlled by the controller 318.

As illustrated in FIG. 10, a near-infrared (NIR) sensor 336 also communicates with mixing loop 322 to detect the alcohol concentration of the solution therein. The NIR sensor 336 also communicates with controller 318 which, as noted previously, controls valve 314. Valve 314 is adjusted so that alcohol is continuously delivered to the mixing loop 322 in variable quantities as controlled by the controller 318.

Only when the target conductivity and alcohol concentration levels have been attained will the delivery valve 332 open via controller 318 to deliver the output of the recirculation loop to the process through outlet port 338. The salt concentrate solution and alcohol addition rates continue to be based on feedback control from the conductivity sensor 326 and NIR sensor 336, respectively. Purge valve 328 and regulator valve 337 operate the same fashion as corresponding valves 228 and 237 of FIG. 9.

In both of the above examples, the systems of FIGS. 9 and 10 were operated so that their first and second stages occurring in a simultaneous fashion. It is to be understood, however, that the stages may alternatively be performed sequentially by the controller of each system. More specifically, with reference to FIG. 9 as an example, pumps 212 and 214 may be controlled by controller 218 while pump 216 remains off, and delivery valve 232 closed, during a first stage of operation. During this first stage, the conductivity sensor communicates with the controller only to control the delivery of salt concentration solution to loop 222. When the conductivity sensor detects that the solution in the mixing loop 222 has reached the target conductivity, the first stage is completed and the solution in loop 222 may either be directed to a storage tank or recirculated in the loop as pumps 212 and 214 are shut down. During the second stage of operation, the controller 218 operates pump 216 so that acid/base modifier solution is delivered to the mixing loop 222 as directed by pH sensor 236. If the solution from the first stage was directed to a storage tank, it may be pumped back into the loop 222 by using either pump 212 or 214 for this second stage. Delivery valve 232 is then opened when the target pH of the solution in loop 222 is reached, since the target conductivity level was reached during the first stage.

Figure 11:
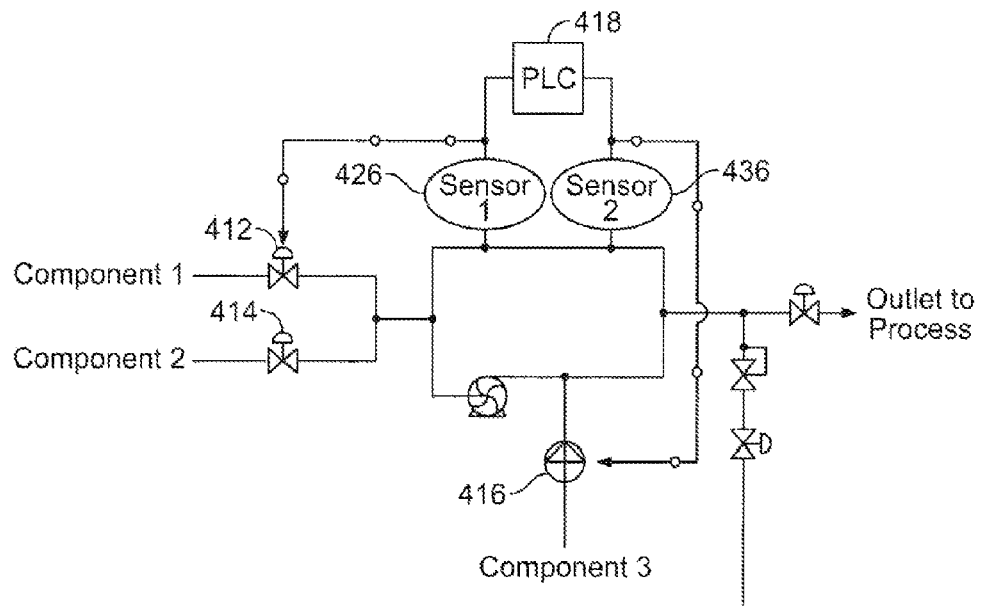
FIG. 11 is a schematic of a third embodiment of the multistage accurate blending system of the invention.

A third embodiment of the system of the present invention is illustrated in FIG. 11. In this, embodiment, pumps 212 and 214 have been replaced by valves 412 and 414, while pump 216 has remained (as pump 416 in FIG. 11). As in previous embodiments, the pumps and valves of the system are controlled by controller 418. Of course a valve could be substituted for the pump 416 in FIG. 11 as well and/or a pump could be substituted for either valves 412 or 414, or both. Indeed, whether pumps or valves are used in the system to perform the metering/dosing is dependent on the application and the user's facility setup.

In addition, sensors other than a conductivity sensor, pH sensor or NIR sensor could be used as the sensors illustrated at 426 and 436 in FIG. 11. Examples include ultraviolet, sensors, temperature sensors and basically any sensor that can detect specific properties of the solution in the mixing device and outputs a measurable signal.

Figure 12:
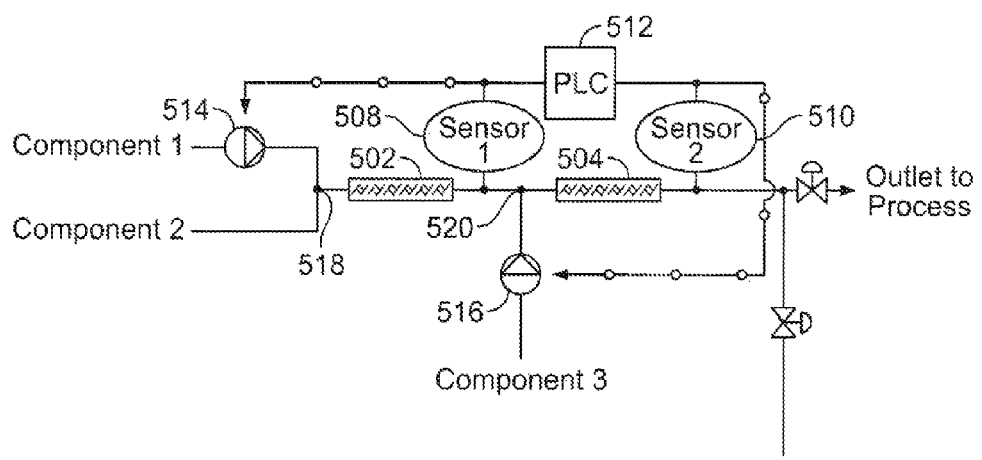
FIG. 12 is a schematic of a fourth embodiment of the multistage accurate blending system of the invention.

The system of FIG. 12 illustrates an embodiment where a pair of inline mixers 502 and 504 are substituted for the recirculation mixing loops of previous embodiments as the mixing device of the system. As illustrated in FIG. 12, the system features sensors 508 and 510 which communicate with the outlets of the inline mixers 502 and 504, respectively. These sensors may be of any type described above with reference to FIGS. 9-11 and communicate with a controller 512 which also communicates with and controls pumps 514 and 516. As a result, the system of FIG. 12 may be operated in essentially the same fashion as the system of FIG. 9. Other mixing devices known in the art may be substituted for the mixing loops and inline mixers of FIGS. 9-12. These include, but are not limited to, surge/blending tanks and T-junctions such as 518 and 520 in FIG. 12. In addition, a pair of mixing loops could be substituted for the inline mixers 502 and 504 of FIG. 12 or the single mixing loops of FIGS. 9 through 11, with each loop featuring an individual sensor.

The system and method of the present invention therefore offers a blending system that uses a continuous mode of operation rather than traditional batch mode processing which, as described earlier, creates significant operational issues in obtaining reproducible results, testing the created liquid and moving and storing the created batch. The present invention is consistent with the guidelines of manufacturing science philosophies such as 6-Sigma and Quality by Design (QBD) in that the in-line streaming process of liquid adjustment results in reduced process cost and generates innate process quality through the process itself, rather than through post-process corrections, as used in batch mode operations. As a result, the system and method of the present invention aid in driving down the cost of manufacturing pharmaceutical products.

While the preferred embodiments of the invention have been shown and described, it will be apparent to those skilled in the art that changes and modifications may be made therein without departing from the spirit of the invention, the scope of which is defined by the appended claims.

What is claimed is:

1. An accurate blending system for blending a feed liquid and first and second adjusting, liquids comprising:
   a) a first feed means adapted to communicate with a supply of feed liquid;
   b) a second feed means adapted to communicate with a supply of the first adjusting liquid;
   c) a third feed means adapted to communicate with a supply of the second adjusting liquid;
   d) a recirculation loop mixing device in communication with the first, second and third feed means;
   e) a first sensor in communication with the recirculation loop mixing device;
   f) a second sensor in communication with the recirculation loop mixing device;
   g) a controller in communication with the first sensor so that a first characteristic of a mixed solution in the recirculation loop mixing device consisting of a mixture of the feed liquid, the first adjusting liquid and the second adjusting liquid can be detected, said controller also in communication with the second feed means so that delivery of first adjusting liquid to the recirculation loop mixing device can be controlled based upon the detected first characteristic;
   h) said controller also in communication with the second sensor so that a second characteristic of the mixed solution in the recirculation loop mixing device can be detected, said controller also in communication with the third feed means so that delivery of second adjusting liquid to the recirculation loop mixing device can be controlled based upon the detected second characteristic; and
   i) said first and second sensors simultaneously detecting the first and second characteristics of the mixed solution so that delivery of the first and second adjusting liquids may occur simultaneously based on the detected first and second characteristics of the mixed solution.

2. The accurate blending system of claim 1 wherein the first, second and third feed means are pumps.

3. The accurate blending system of claim 1 wherein the first, second and third feed means are valves.

4. The accurate blending system of claim 1 wherein the first and second feed means are valves and the third feed means is a pump.

5. The accurate blending system of claim 1 wherein the first feed means is a pump and the second and third feed means are valves.

6. The accurate blending system of claim 1 wherein the first and second feed means are pumps and the third feed means is a valve.

7. the accurate blending system of claim 1 wherein the recirculation mixing loop includes a pump.

8. The accurate blending system of claim 1 wherein the first sensor is a conductivity sensor and the second sensor is a pH sensor.

9. The accurate blending system of claim 8 wherein the first adjusting liquid is a salt concentrate solution and the second adjusting liquid is an acid/base modifier solution.

10. The accurate blending system of claim 8 wherein the feed liquid is water.

11. The accurate blending system of claim 1 wherein the first sensor is a conductivity sensor and the second sensor is a near-infrared sensor.

12. The accurate blending system of claim 11 wherein the first adjusting liquid is a salt concentrate solution and the second adjusting liquid is alcohol.

13. The accurate blending system of claim 12 wherein the feed liquid is water.

14. The accurate blending system of claim 1 wherein the controller is programmed to initially adjust the second and third feed means sequentially.

15. The accurate blending-system of claim 1 wherein the controller is programmed to initially adjust the second and third feed means simultaneously.

16. The accurate blending system of claim 1 wherein the controller also communicates with the first feed means.

17. A method for blending a feed liquid and first and second adjusting liquid comprising the steps of:
  a) providing a recirculation loop mixing device;
  b) feeding a feed liquid to the recirculation loop mixing device;
  c) sensing a first characteristic of a solution in the recirculation loop mixing device;
  d) feeding a first adjusting liquid to the recirculation loop mixing device based on the sensed first characteristic of the solution in the recirculation loop mixing device;
  e) mixing the first adjusting liquid and feed liquid in the recirculation loop mixing device;
  f) sensing a second characteristic of the solution in the recirculation loop mixing device;
  g) feeding a second adjusting liquid to the recirculation loop mixing device based on the sensed second characteristic of the solution in the recirculation loop mixing device;
  h) mixing the first and second adjusting liquids and feed liquid in the recirculation loop mixing device to provide a mixed solution in the recirculation loop mixing device; and
  i) simultaneously detecting the first and second characteristics of the mixed solution so that delivery of the first and second adjusting liquids may occur simultaneously based on the detected first and second characteristics of the mixed solution.

18. The method for blending of claim 17 wherein steps e) and h) include pumping the solution in the mixing loop to perform the recirculation.

19. The method for blending of claim 17 wherein step b) includes pumping the feed liquid to the mixing device.

20. The method for blending of claim 17 wherein step d) includes pumping the first adjusting liquid to the mixing device.

21. The method for blending of claim 17 wherein step g) includes pumping the second adjusting liquid to the use device.

22. The method of blending of claim 17 wherein step c) includes sensing the conductivity of the solution.

23. The method of blending of claim 22 wherein step f) includes sensing the pH of the solution.

24. The method of blending of claim 23 wherein the feed liquid includes water.

25. The method of blending of claim 22 wherein step f) includes sensing the alcohol concentration of the solution.

26. The method of blending of claim 25 wherein the feed liquid includes water.

* * * * *